(12) United States Patent
Ahmadi-Ardakani

(10) Patent No.: US 9,417,863 B2
(45) Date of Patent: Aug. 16, 2016

(54) SYSTEM AND METHOD FOR EXPEDITED LOADING OF AN IMAGE ONTO A STORAGE DEVICE

(71) Applicant: Western Digital Technologies, Inc., Irvine, CA (US)

(72) Inventor: Arya Ahmadi-Ardakani, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 338 days.

(21) Appl. No.: 14/085,608

(22) Filed: Nov. 20, 2013

(65) Prior Publication Data

US 2015/0095904 A1 Apr. 2, 2015

Related U.S. Application Data

(60) Provisional application No. 61/883,952, filed on Sep. 27, 2013.

(51) Int. Cl.
*G06F 9/44* (2006.01)
*G06F 9/445* (2006.01)
*G06F 11/36* (2006.01)

(52) U.S. Cl.
CPC .............. *G06F 8/63* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,623,604 A * | 4/1997 | Russell | G06F 8/60 709/221 |
| 6,499,054 B1 | 12/2002 | Hesselink et al. | |
| 6,732,158 B1 | 5/2004 | Hesselink et al. | |
| 6,868,448 B1 * | 3/2005 | Gupta | G06F 9/54 709/215 |
| 7,120,692 B2 | 10/2006 | Hesselink et al. | |
| 7,243,224 B2 | 7/2007 | Nair et al. | |
| 7,284,120 B2 * | 10/2007 | Blouin | G06F 9/441 709/217 |
| 7,299,354 B2 | 11/2007 | Khanna et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,214,692 B1 * | 7/2012 | Spalink | G06F 11/2273 713/1 |
| 8,255,661 B2 | 8/2012 | Karr et al. | |

(Continued)

OTHER PUBLICATIONS

International Search Report and Written Opinion dated Dec. 30, 2014 from related PCT Serial No. PCT/US2014/057560, 9 pages.

*Primary Examiner* — Adam Lee

(57) ABSTRACT

Embodiments of an image loading system are disclosed for installing testing software on a storage device. In one embodiment, the system includes a network storage that stores testing software for storage devices, a software loader operating on a storage device, and a testing manager. In an embodiment, the testing manager is configured to broadcast at least one packet containing a specific code on a network, wherein receipt of the specific code causes the software loader to request a location of the testing software and transmit a location of the network storage to the software loader, thereby causing the software loader to obtain the testing software from the network storage and load the testing software on the storage device.

19 Claims, 4 Drawing Sheets

(56) References Cited

U.S. PATENT DOCUMENTS

| | | | |
|---|---|---|---|
| 8,281,119 B1* | 10/2012 | Spangler | G06F 9/4401 |
| | | | 713/1 |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 2003/0200428 A1 | 10/2003 | Chan et al. | |
| 2004/0031032 A1* | 2/2004 | Clough | G06F 8/60 |
| | | | 717/177 |
| 2004/0205406 A1 | 10/2004 | Kaliappan et al. | |
| 2004/0255201 A1* | 12/2004 | Liu | G06F 11/2294 |
| | | | 714/43 |
| 2005/0081186 A1* | 4/2005 | Tigani | G06F 8/60 |
| | | | 717/101 |
| 2005/0144195 A1 | 6/2005 | Hesselink et al. | |
| 2005/0144200 A1 | 6/2005 | Hesselink et al. | |
| 2005/0223373 A1* | 10/2005 | Gage | G06F 8/65 |
| | | | 717/168 |
| 2007/0226712 A1 | 9/2007 | Saunders | |
| 2008/0271018 A1 | 10/2008 | Gross et al. | |
| 2009/0100294 A1* | 4/2009 | Fellenstein | G06F 11/3414 |
| | | | 714/27 |
| 2009/0254641 A1 | 10/2009 | Liu et al. | |
| 2010/0107146 A1 | 4/2010 | Wrighton et al. | |
| 2010/0125739 A1* | 5/2010 | Creary | H04L 9/0822 |
| | | | 713/189 |
| 2010/0287424 A1 | 11/2010 | Kwon | |
| 2011/0067022 A1* | 3/2011 | Williams | G06F 8/63 |
| | | | 717/172 |
| 2012/0036041 A1 | 2/2012 | Hesselink | |
| 2012/0054734 A1* | 3/2012 | Andrews | G06F 8/65 |
| | | | 717/171 |
| 2013/0132943 A1* | 5/2013 | Karayi | G06F 8/60 |
| | | | 717/177 |
| 2013/0212401 A1 | 8/2013 | Lin | |
| 2013/0238885 A1 | 9/2013 | Tripathi et al. | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0047040 A1* | 2/2014 | Patiejunas | H04L 51/24 |
| | | | 709/206 |
| 2014/0095439 A1 | 4/2014 | Ram | |
| 2014/0169921 A1 | 6/2014 | Carey | |
| 2014/0173215 A1 | 6/2014 | Lin et al. | |
| 2014/0208091 A1* | 7/2014 | Koning | G06F 9/4401 |
| | | | 713/2 |

* cited by examiner

SYSTEM AND METHOD FOR EXPEDITED LOADING OF AN IMAGE ONTO A STORAGE DEVICE

CROSS-REFERENCE TO RELATED APPLICATIONS

This application claims priority to U.S. Provisional Application No. 61/883,952, entitled "SYSTEM AND METHOD FOR EXPEDITED LOADING OF AN IMAGE ONTO A STORAGE DEVICE," filed on Sep. 27, 2013, which is herein incorporated by reference in its entirety.

BACKGROUND

Some storage devices, like network attached storage, run operating systems in order to provide services to computing devices connecting via a network. These storage devices can function as stand-alone servers and are generally more complex than other types of storage that operate with a host. In order to verify that these storage devices are working correctly, manufacturers test their operation prior to shipment. Such testing can test the hardware circuitry of the storage device (e.g., a controller board), a storage medium (e.g., a hard disk drive), the device firmware, and/or the operating system.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

In many cases, in order to start up and test a storage device (e.g., during a manufacturing/testing process in a factory), the storage device, such as a network attached storage (NAS), is loaded with a software image to render it operable. Typically, this software image comprises a basic operating system, testing software/scripts, and/or the like used by the storage device for operations. Generally, the software image is loaded onto storage devices by purpose-built cloning devices that are expensive and have a limited number of slots for processing storage devices. Unfortunately, loading of this software can require a significant amount of time, which can delay testing and/or manufacturing of the storage device. As a result, these purpose-built cloning devices can create bottlenecks in the testing process.

In some embodiments, an image loading system (ILS) reduces the amount of time required to flash/boot an image on to a storage device. The ILS can provide fast imaging and/or booting of a storage device. Fast imaging/booting of the storage device may be useful in various situations, such as during drive testing. Furthermore, the ILS can bypass the need to use expensive and limited purpose-built cloning devices, thereby allowing greater parallelization during the testing process. In one embodiment, general purpose hardware such as one or more servers, switches, and/or other networking devices are used to provide the functionality previously provided by the purpose-built cloning devices. During special circumstances, such as drive testing, the storage device is coupled the ILS via a local area network. For example, the storage device may be attached to a switch, router, or other connecting device capable of interfacing with the network. Such connecting devices can be significantly simpler and less expensive than the purpose-built cloning devices.

Various aspects of an image loading system will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Figure 1:
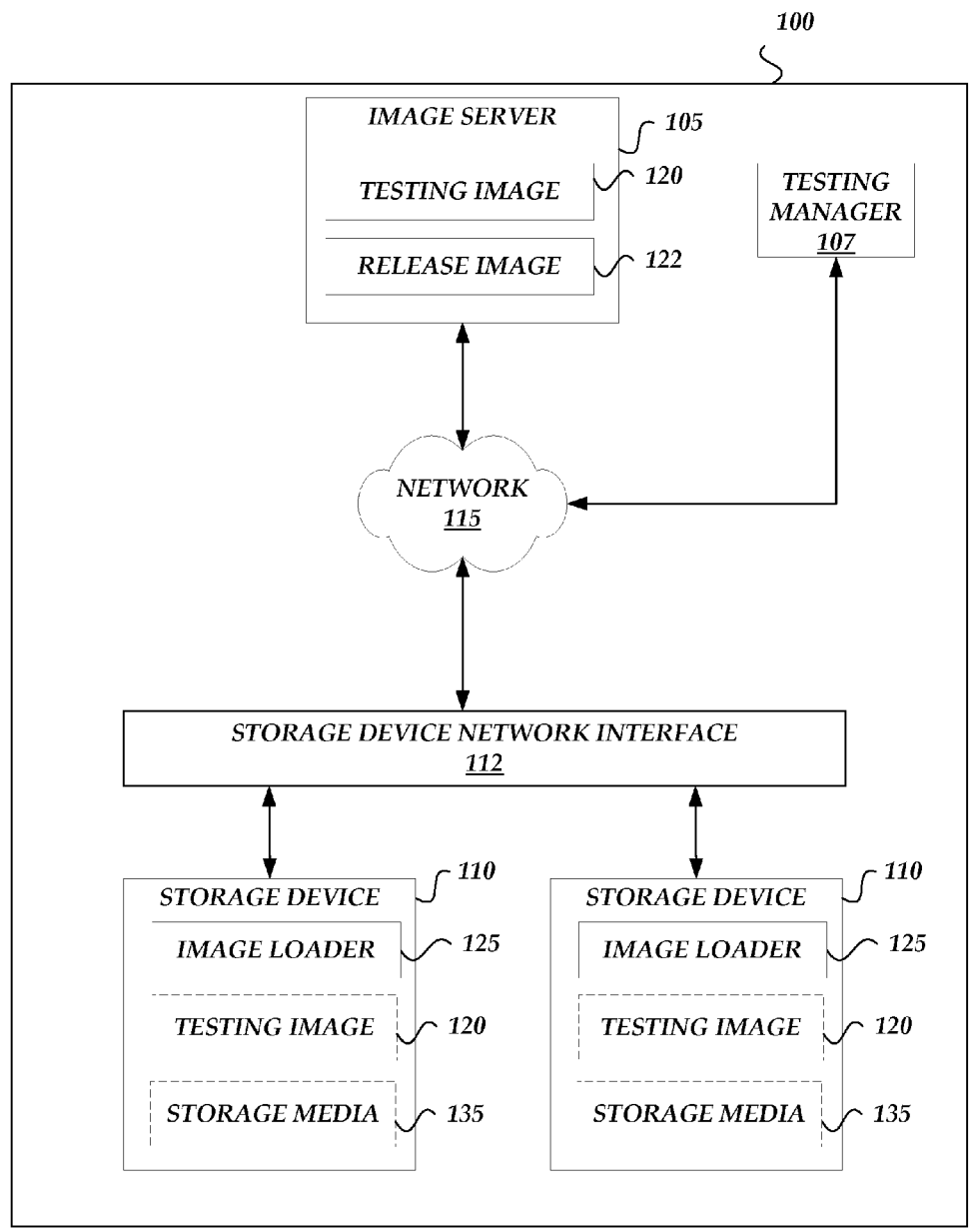
FIG. 1 illustrates a block diagram of an embodiment of an image loading system that enables testing of storage devices.

FIG. 1 illustrates a block diagram of an embodiment of an image loading system 100 that enables testing of storage devices. In FIG. 1, the ILS comprises an image server 105, a testing manager 107, a storage device network interface 112, and one or more connected storage devices 110. The components of the ILS can communicate with each other via a network 115, such as a local area network, through wired or wireless connections. The functionality of various components of the ILS may be combined and performed by a single component of the ILS. For example, the image server 105 and the testing manager 107 may be combined.

In one embodiment, a testing manager 107, comprising a physical or virtual computer server having a processor and memory. The testing manager 107 is coupled to the network 115 and transmits encoded data packets, such as Internet Control Message Protocol (ICMP) packets. Such packets may be encrypted. In one embodiment, the storage device is configured to recognize the special code, which causes the storage device to initiate a special boot mode. For example, the storage device may be pre-loaded with the special code or can perform a calculation (e.g., using a hash function, cryptographic function or the like) to verify the special code.

In an embodiment, the storage device 110 then requests an address from the testing manager 107 for a location, such as an image file and/or script server (referred to hereafter as an image server 105) from which the desired image is obtainable. For example, the image server 105 may be some type of server or network storage. In some embodiments, the image is a truncated or special-purpose image, such as a testing image 120, which can be loaded/booted in a relatively short period of time. For example, the testing image may include only a stripped-down operating system and drivers sufficient to render the hardware of the storage device operation plus testing software or scripts. The image server 105 may also store additional images, such as a release image 122 that contains the full operating system for a retail storage device. Generally, an image is a file containing the complete contents and structure representing a data storage medium or device, such as a hard drive, tape drive, floppy disk, optical disc, or USB flash drive. Some images omit unused file space or are otherwise compressed to reduce storage requirements. Images may also be referred as archive files.

In one embodiment, the storage devices 110 are connected to the network 115 via a storage device network interface 112, such as a multi-port switch. For example, several NAS devices may be connected to the network 115 via a single 16-port (or other size) switch. In an embodiment, the storage device 110 includes an image loader 125 capable of loading images onto the storage device. For example, the image loader 125 may be a device firmware configured to recognize when the storage device 110 is in communication with the testing manager 107 and enter into a boot mode during which an image can be loaded onto the storage device. In some cases, multiple images may be loaded onto the storage device during the manufacturing process. For example, the testing image 120 may be loaded onto the storage device 110 during a testing process and then, if the storage device 110 passes the tests, the release image 122 is subsequently loaded onto the storage device 110.

In some embodiments, testing of the storage devices 110 occurs in one more testing stages. For example, in a two-stage embodiment, in the first stage, the controller board for the storage device is tested. There may or may not be storage media 135 installed on the device, such as a hard disk drive (HDD), solid-state drive (SSD) or a solid-state hybrid drive (SSHD). During the first stage, a first testing image that includes tests for the controller board (or other control circuitry) can be loaded onto the storage device 110. In the second stage, the storage media is tested and a second testing image that includes tests for the storage media can be loaded onto the storage device 110. By having stage-specific testing images that don't include extraneous data, the testing images can be loaded faster, speeding up testing. In other embodiments, the testing occurs in a single stage and there may only be a single testing image 120 used.

In some embodiments, as the loading process is dynamic, revisions to the test image file can be rolled out easily. For example, a new version of the test image can be placed in the image server and storage devices connected to the network would automatically be pointed to the new version and use that new version during the testing process. In comparison, in a process that uses purpose-built cloning devices, each of the purpose-built cloning devices would have to be updated in order to roll-out a new testing methodology.

Figure 2:
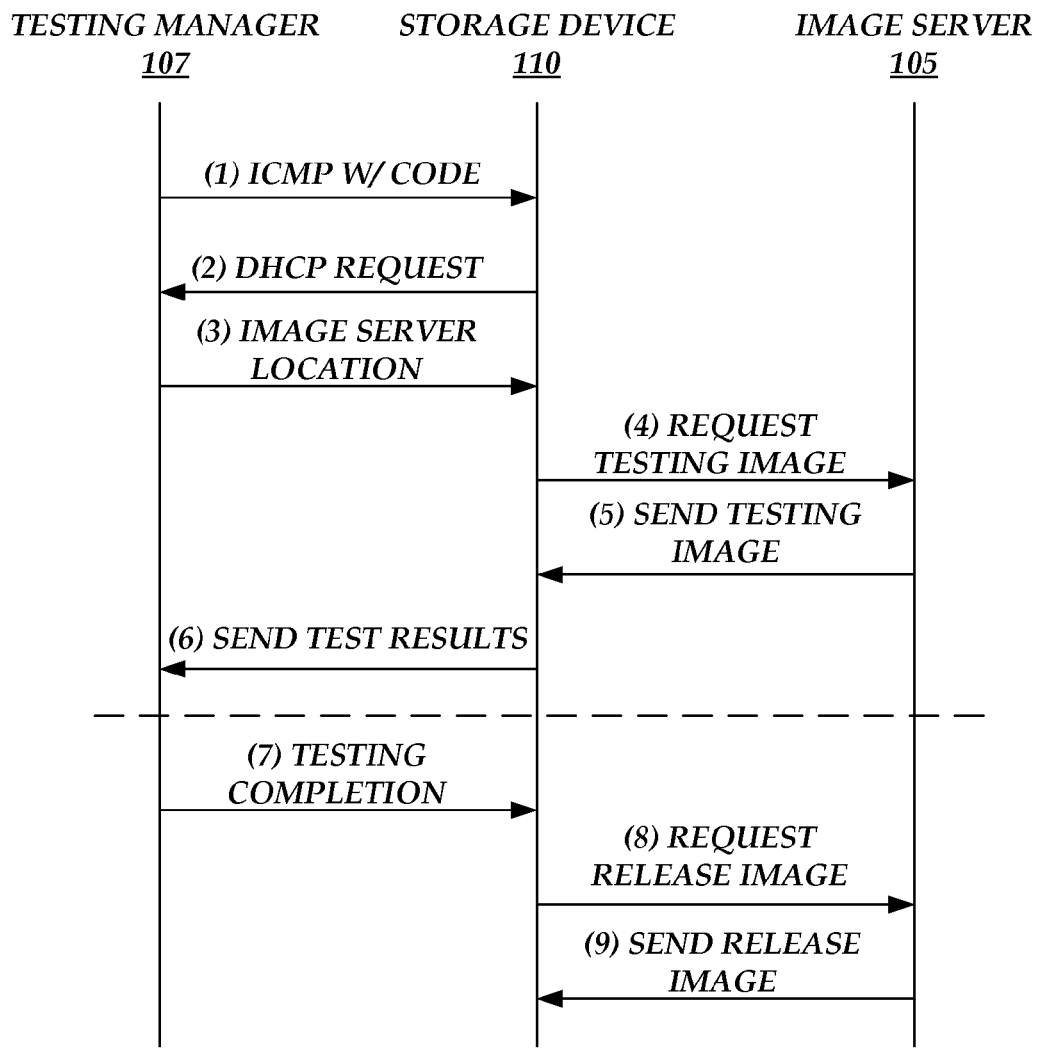
FIG. 2 illustrates a flow chart of an embodiment of the data flow for the image loading system of FIG. 1.

FIG. 2 illustrates a flow chart of an embodiment of the data flow for the image loading system of FIG. 1. The sample data flow is discussed in the context of an example scenario that is intended to illustrate, but not to limit, various aspects of the ILS.

Beginning at data flow (DF) 1, the testing manager 107 sends an ICMP packet with a code to the storage device 110. As discussed above, the code may be encrypted. The storage device 110 receives the ICMP packet and verifies that it includes the expected code. In one embodiment, receiving a valid code causes the storage device 110 to enter a boot mode, during which an image can be loaded.

At DF 2, the storage device 110 attempts to obtain a testing image by sending a DHCP request to determine a network location for the testing image. At DF 3, the testing manager 107 sends the image server location (e.g., an IP address) to the storage device 110 in response to its request.

At DF 4, the storage device 110 requests the testing image from the image server 105. At DF 5, the image server provides the testing image to the storage device. The storage device 110 can then load the testing image and run the testing programs/scripts provided by the testing image.

At DF 6, the storage device 110, after completing the testing process, provides the test results to the testing manager 107. The results can range from detailed results from various tests or may be a simple pass/fail. The testing manager 107 can then determine whether the tests were passed, whether remediation steps are necessary, and/or a final disposition for the storage device 110.

Assuming the storage device passed the tests, at DF 7, the testing manger can, optionally, indicate to the storage device 110 that the tests were completed successfully and/or direct the storage device 110 to obtain the release image. At DF 8, the storage device requests the release image from the image server which the image server provides (DF 9). The storage device 110 can then load the release image in anticipation of the storage device 110 being packaged and shipped out to customer.

In some embodiments, DF 7-9 may not occur. For example, loading the release image may be performed by a different system than the image loading system 100. In other embodiments, additional data flow steps may occur between DF 6 and DF 7. For example, in embodiments employing multiple testing stages, DFs 1-6 (or a subset) may be repeated multiple times before DF 7 occurs.

Figure 3:
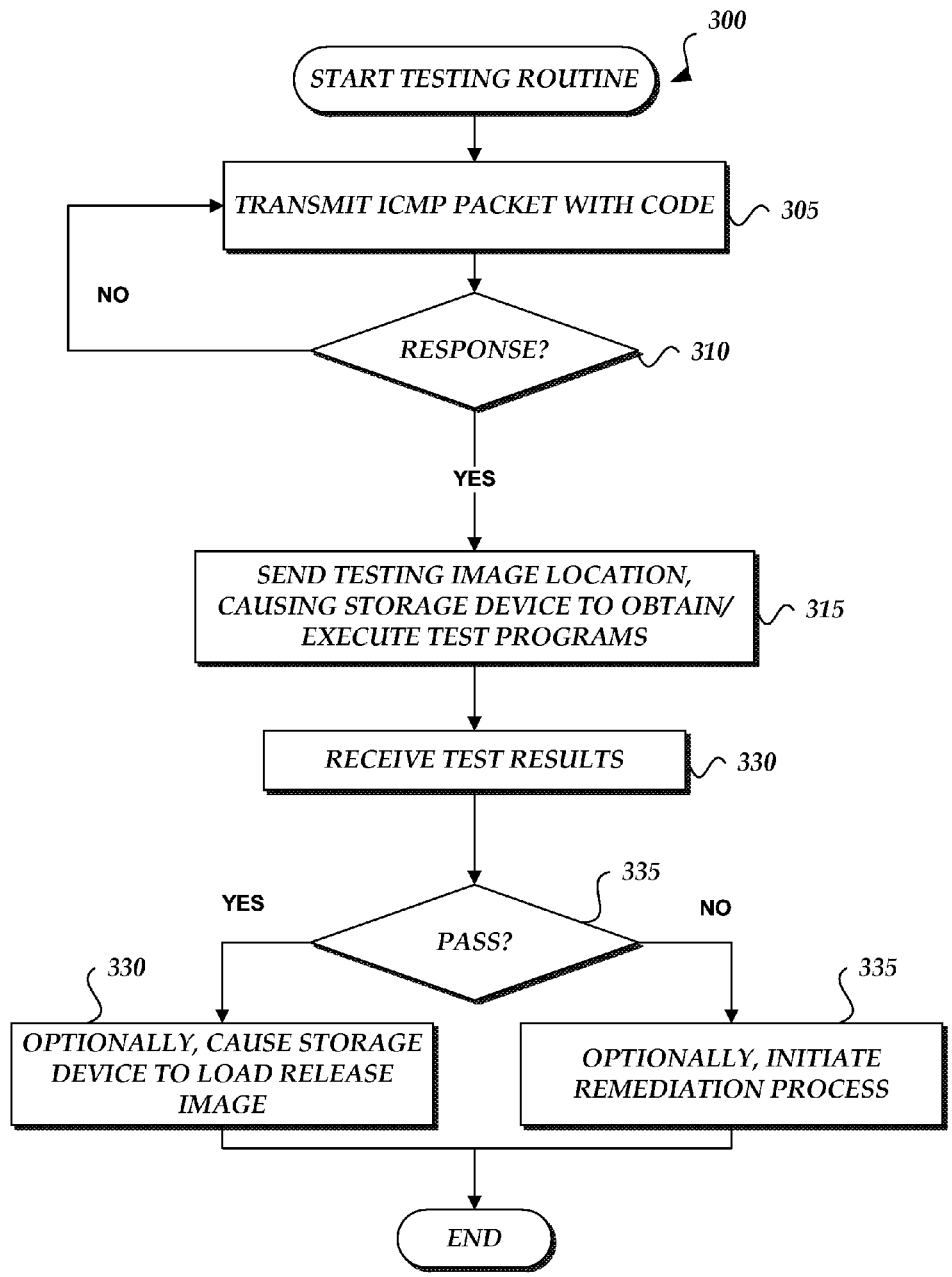
FIG. 3 illustrates a flow chart of an embodiment of a testing routine for a testing manager.

FIG. 3 illustrates a flow chart of an embodiment of a testing routine 300. In some implementations, the routine is performed by embodiments of the ILS or by one of its components, such as the testing manager 107. For ease of explanation, the following describes the routine as performed by the testing manager 107. The routine is discussed in the context of an example scenario that is intended to illustrate, but not to limit, various aspects of the ILS.

Beginning at block 305, the testing manager 107 transmits ICMP packets with a special code. The testing manager 107 may send the packets periodically, intermittently, or in response to detecting a storage device joining the network. In one embodiment, the storage device receives the ICMP packets and checks the special code or key against its stored key (e.g., stored in a protected area of memory or its firmware) or otherwise performs a calculation to validate the special code. If the special code is valid, the storage device is programmed to send a Dynamic Host Configuration Protocol (DHCP) request back to the load server.

At block 310, the testing manager 107 detect if any responses are received from a storage device 110. In some cases, there may not be any storage devices connected to the network or connected storage devices are busy (e.g., loading images or running test processes and no responses are received. In one embodiment, new storage devices connected to the network 115 respond with DHCP requests, as described above.

At block 315, the server can respond to the DHCP request by providing the location (e.g., an IP address) of the image server 105 for use by the storage device along any other necessary parameters, thereby causing the storage device to obtain/execute test programs and procedures. In one embodiment, the image loader 125 on the storage device 110 is configured to, in response to receiving the image location, obtain the testing image from the image location (e.g., image server 105), load the image, and execute the test programs in the image.

In one embodiment, the testing image 120 is a special-purpose image that enables hardware testing of the storage device. For example, while a release image 122 loaded prior to shipping the storage device to customers may contain the full operating system, a large set of drivers, customer software and the like, a testing image 120 may include only a stripped-down operating system, a small set of drivers and/or testing software sufficient to perform testing on the storage device. As a result, the testing image may be much smaller than the release image. Since the testing image can be relatively small, it can be loaded in a short period of time in comparison to the larger release image. As a result, the boot up process for the testing image may be significantly shorter than for the release image, thereby allowing testing to occur earlier and shortening the overall testing process.

At block 330, the testing manager 107 receives the test results from the storage device after the testing programs complete execution. In some embodiments, the test results provide detailed performance statistics, error rates, and the like for the storage device. In some embodiments, the test results are a simple pass/fail.

At block 335, the testing manager 107 processes the results and determines whether the storage device passed the tests. If the storage device passed the tests, the routine 300 moves to block 330. If the storage device failed the tests, the routine 300 moves to block 335.

At block 330, if testing is complete for the storage device, the testing manager 107 can optionally cause the device to load the release image, in preparation for shipment to customers. In one embodiment, additional drive testing may be performed on the storage device after the release image is loaded. The routine 300 can then end.

At block 335, the testing manager 107 can optionally initiate remediation process for the storage device. For example, the testing manager 107 may send a report to a system administrator or quality assurance personnel that the storage device has failed. In some situations, the testing manager 107 may cause the storage device to repeat the testing procedures or may initiate additional testing procedures on the storage device. The testing manager 107 can also mark (e.g., in a database or a report) that the storage device is bad so that the storage device can be pulled from production. The routine 300 can then end.

In some embodiments, multiple storage devices 110 are being serviced by the testing manager 107 in parallel. As a result, at any given time, the testing manager 107 can be at different stages in the routine for different storage devices. For example, the testing manager 107 may be at block 310 for a first storage device and at block 330 for a second storage device. By allowing for greater parallelization in the testing process, the testing process can be significantly shortened. For example, as greater numbers of connecting devices can be used—with greater overall storage device capacity—instead of purpose-built cloning devices, more storage devices can be tested at a time. In a trial implementation of the ILS, the testing process was shortened by up to 40%. The embodiments may also be useful in other situations, such as during diagnostic testing, Basic Input/Output System (BIOS) updating, automation of image deployment to device, etc.

Figure 4:
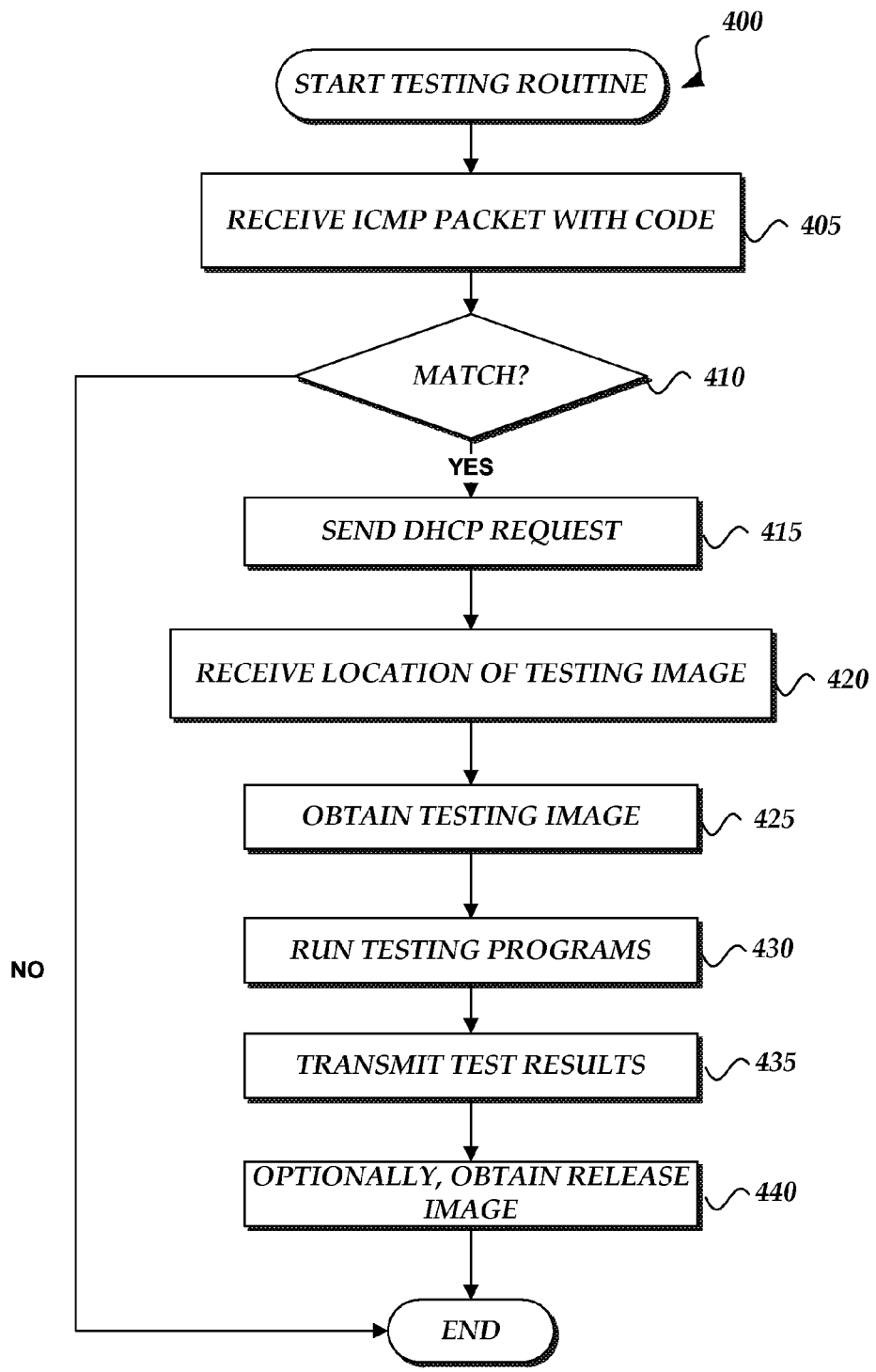
FIG. 4 illustrates a flow chart of an embodiment of a testing routine for a storage device.

FIG. 4 illustrates a flow chart of an embodiment of a testing routine 400. In some implementations, the routine is performed by embodiments of the ILS or by one of its components, such as a storage device 110 connected to the ILS. For ease of explanation, the following describes the routine as performed by a connected storage device 110. Several steps in the routine 400 have been described in greater detail above, so are described only cursorily. The routine is discussed in the context of an example scenario that is intended to illustrate, but not to limit, various aspects of the ILS.

Beginning at block 405, the storage device 110 receives an ICMP packet with a special code. At block 410, the storage device validates the special code. If the code is invalid, the routine 400 ends. If the code is valid, the storage device 110 responds by sending a DHCP request.

At block 420, the storage device 110 receives the location of the testing image from the ILS. At block 425, the storage device 110 obtains the testing image from the ILS. In one embodiment, the storage device 110 boots from the testing image to execute software in the image that renders hardware of the storage device operational, as well as to execute testing programs or scripts stored in the image. For example, the testing image may contain a stripped-down operating system and drivers that allows the storage device to operate/test the device's hardware.

At block 430, the storage device runs testing programs or scripts in the testing image. At block 435, once the tests are completed, the storage device transmits test result to the ILS. In one embodiment, the storage device stops, shuts down, or otherwise halts after the testing process is complete. Personnel supervising the testing can then unplug the storage device from power and/or the network. This is one way of preventing the storage device from re-entering a boot mode. Other possibly solutions include tracking the status of the storage devices or tracking which storage devices have already completed testing.

Optionally, at block 440, the storage device obtains a release image that contains a complete operation system for the storage device, for example, if the storage device passed all tests. The routine 400 can then end.

In one embodiment, a method of imaging a storage device comprises: connecting the storage device to a network; broadcasting at least one packet containing a code; identifying, by the storage device, the code contained within the packet; requesting, by the storage device, a location of an image to be loaded on to the storage device; and providing, to the storage device, the location of the image.

In one embodiment, a method of testing a storage device comprises: connecting the storage device to be tested to a network, wherein communications on the network comprise packets containing a code; initiating, by the storage device, a boot mode in response to the packets containing the code; loading, by the storage device while in the boot mode, a first image that renders the hardware of the storage device operational; testing the hardware of the storage device; and testing a drive of the storage device after testing of the hardware.

Many implementation variations are possible. For example, while above has discussed using ICMP and DHCP, other protocols could be used to implement the ILS. In addition, while the above has discussed using images to distribute the software needed by storage devices for testing, embodiments of the ILS can package/distribute the software in other forms, such as executables, archive files or the like. In some embodiments, the above system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the above system and its components are executed or embodied by one or more physical or virtual computing systems. For example, in some embodiments, a computing system, such as a server or mobile device, that has components including a central processing unit (CPU), input/output (I/O) components, storage and memory may be used to execute some or all of the components of the above system. The I/O components can include a display, a network connection to the network, a computer-readable media drive and other I/O devices (e.g., a keyboard, a mouse, a touch screen, speakers, etc.).

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for installing testing software on a storage device, the system comprising:
    a network storage that stores testing software for storage devices, the network storage located on a network;
    a software loader operating on a storage device, the software loader configured to request and obtain testing software from the network storage in response to receiving and successfully validating a specific code from the network; and
    a computing device configured to:
        broadcast at least one packet containing the specific code on the network, wherein receipt of the specific code by the software loader causes the software loader to validate the specific code and to request a location of the testing software responsive to successful validation; and
        transmit a location of the network storage to the software loader responsive to the request, thereby causing the software loader to locate the network storage, obtain the testing software from the network storage and load the testing software on the storage device.

2. The system of claim 1, wherein the computing device is further configured to:
    receive testing results from the storage device; and
    initiate loading of a release image on the storage device based on the testing results, the release image being of greater size than the testing software;
    wherein the release image overwrites the testing software on the storage device.

3. The system of claim 1, wherein the testing software is configured to render the storage device operative.

4. The system of claim 1, wherein broadcasting at least one packet comprises broadcasting at least one Internet Control Message Protocol (ICMP) packet.

5. The system of claim 1, wherein the testing software comprises a bootable image for rendering hardware of the storage device operational.

6. The system of claim 5, wherein loading the testing software comprises booting up the storage device from the bootable image.

7. The system of claim 1, wherein the storage device comprises a network attached storage (NAS) controller board.

8. The system of claim 7, wherein the storage device comprises at least one of a hard disk drive (HDD), solid-state drive (SSD) or a solid-state hybrid drive (SSHD).

9. A method for installing a bootable image on a storage device that is connected to a network, said method comprising:
    broadcasting, on the network, at least one packet containing a code, wherein receiving the code by the storage device causes the storage device to identify and validate the code and, upon successful validation, to send a request for a location of the bootable image to be loaded on to the storage device;
    receiving, from the storage device, the request; and
    providing, to the storage device, the location of the bootable image, wherein receiving, by the storage device, the location of the bootable image causes the storage device to locate the bootable image, obtain the bootable image, and load the bootable image onto the storage device.

10. The method of claim 9, wherein broadcasting at least one packet comprises broadcasting at least one Internet Control Message Protocol Packet.

11. The method of claim 9, wherein the at least one packet is encrypted.

12. The method of claim 9, wherein receiving the code further causes the storage device to enter a boot mode.

13. The method of claim 9, wherein receiving the location of the bootable image further causes the storage device to load the bootable image on to the storage device responsive to a script.

14. The method of claim 9, wherein the bootable image comprises a bootable image for rendering hardware of the storage device operational.

15. A method of testing a storage device that is connected to a network, said method comprising:
    receiving by the storage device, a packet from the network, wherein the packet contains a code;
    validating, by the storage device, the code; and
    in response to successful validation:
        initiating, by the storage device, a boot mode;
        requesting, by the storage device, a location of an image;
        receiving, by the storage device, the location of the image;
        loading, by the storage device while in the boot mode, the image from the location, wherein the image renders hardware of the storage device operational;
        testing the hardware of the storage device; and
        testing a storage medium of the storage device after testing of the hardware.

16. The method of claim 15, further comprising installing an operating system on the storage device after testing of the storage medium.

17. The method of claim 15, wherein the hardware comprises a controller board.

18. The method of claim 15, wherein the storage device comprises a network attached storage (NAS).

19. The method of claim 15, wherein the storage medium comprises at least one of a hard disk drive (HDD), solid-state drive (SSD) or a solid-state hybrid drive (SSHD).

* * * * *